United States Patent [19]

Brix

[11] 4,027,752

[45] June 7, 1977

[54] DISC BRAKES FOR VEHICLES

[75] Inventor: Herman Josef Brix, Koblenz, Germany

[73] Assignee: Girling Limited, Birmingham, England

[22] Filed: Jan. 23, 1976

[21] Appl. No.: 651,722

[30] Foreign Application Priority Data

Jan. 23, 1975 United Kingdom ............... 2916/75

[52] U.S. Cl. ........................... 188/73.6; 188/206 R
[51] Int. Cl.$^2$ ....................................... F16D 55/228
[58] Field of Search ............... 188/73.3, 73.5, 73.6, 188/366–370, 206 R, 217

[56] References Cited

UNITED STATES PATENTS

| | | | |
|---|---|---|---|
| 3,189,129 | 6/1965 | Burnett | 188/73.6 |
| 3,525,420 | 8/1970 | Honick et al. | 188/73.6 X |

Primary Examiner—Duane A. Reger
Attorney, Agent, or Firm—Scrivener Parker Scrivener & Clarke

[57] ABSTRACT

In a disc brake a thrust transmitting device is interposed between a friction pad assembly and a piston for applying the friction pad assembly to a rotatable disc. The device comprises a shim of which a part is cut-out over a portion of what would otherwise be the area of contact between the piston and the friction pad assembly so that thrust is applied to the friction pad assembly only over the remainder of that area, and the device includes a projection defining a stop to prevent insertion of the shim into the brake with the pad assembly in position, the axial length of the thrust transmitting device being less than the thickness of the pad assembly minus the wear thickness thereof.

5 Claims, 4 Drawing Figures

DISC BRAKES FOR VEHICLES

SPECIFIC DESCRIPTION

This invention relates to improvements in thrust transmitting devices for use in disc brakes for vehicles of the kind in which a friction pad assembly is adapted to be urged into engagement with a rotatable disc by means of a piston slidably guided in a bore in a housing of which the axis of the bore is substantially at right angles to the plane of the disc and the thrust transmitting device is adapted to be interposed between the piston and the friction pad assembly and comprises a shim of which a part is cut-out over a portion of what would otherwise be the area of contact between the piston and the friction pad assembly when the shim is in its position of use in the brake whereby when the piston is advanced in the bore it applies a thrust to the friction pad assembly only over the remainder of that area. Hereinafter the thrust transmitting device will be referred to as "a thrust transmitting device of the kind referred to".

In one known construction of disc brake of the kind set forth the thrust transmitting device of the kind referred to comprises a planar shim and after replacing the friction pad assembly the shim can be inserted into the brake between the piston and the new or replacement pad assembly. Of course, the piston must first have been forced back into the bore to provide sufficient axial space between the inner end of the piston and the disc to receive the new or replacement pad assembly and preferably also the shim. However, when the axial space is sufficient only to receive the pad assembly, if the shim is then forced between the pad assembly and the piston there is a possibility of the shim cutting or otherwise damaging a flexible boot connected between the housing and the inner end of the piston which might utlimately lead to corrosive seizing of the piston in the bore.

If the known planar shim is inserted into its operative position next to the piston before the replacement pad assembly is inserted into the brake, then the danger of damage to the boot, or to the device itself, is reduced substantially. Without the pad assembly in position insertion of the shim is trivially simple. However it often happens that the pad assembly is inserted into the brake first, and the shim is then forced between the pad assembly and the piston. It is the aim of our invention to ensure that it is impossible to insert the thrust transmitting device into its operative position if the pad assembly with which the device is to be associated has previously been installed in the brake.

In a disc brake of the kind set forth in which the piston is hollow and acts on the friction pad assembly over an annulus it is known for the thrust transmitting device of the kind referred to to be a shim of complex construction including a rearwardly directed annular flange which is pressed into the bore at the inner end of the piston to couple the piston and the shim so that they move together. Thus this known thrust transmitting device has also achieved the purpose of our invention as set out above, in that it too cannot be inserted with the pad assembly is in position in the brake.

The known shim however also includes forwardly dircted tags adapted to engage the radially innermost edge of the pad assembly to assist in orientating the shim, which might otherwise rotate about its spigot engagement with the piston. The effect of these tags, in combination with the spigot, is that it is impossible easily to remove the shim for replacement of the pad assembly. Removal of a worn pad assembly comprises the steps of removing the old worn-out pad assembly, removing the shim, inserting a piston retraction tool (eg. a screw-driver or the like) into the brake, and finally manipulating the tool to drive the piston back with the tool. If the shim cannot be removed from the space vacated by the removal of the worn-out pad assembly, then the shim must still be present when the tool is inserted and the piston retracted. The likelihood of damage to the shim occurring is very great. Furthermore, because the annular flange forms a continuous spigot in the piston, any distortion of the spigot, due to the action of the tool, may tend to cause the shim to jam in the piston, so that it may become difficult to remove the shim, even after the piston has been retracted.

Our device is an improvement over the known device in that it is so constructed as to eliminate the above problem.

According to our present invention a thrust transmitting device of the kind referred to for use in a disc brake of the kind set forth includes a projection defining a stop to prevent insertion of the shim into the brake with the pad assembly in position, and the axial length of the thrust transmitting device is less than the thickness of the pad assembly minus the wear thickness thereof.

Thus after removal of a worn pad assembly the shim can then be removed from the brake before the piston is forced back into its bore for the insertion of a new pad assembly.

Even if our shim should be inadvertently left in the brake when the tool is inserted and the piston retracted, and projection is so constructed and arranged that any damage caused by the tool to the shim will not cause the shim to jam in the piston. Thus the shim can be easily removed following full piston retraction.

Conveniently the projection comprises a portion of the part which would otherwise be cut out and discarded, the portion being deformed to a position normal to the plane of the shim.

When the piston is hollow the projection is deformed from that edge of the part which is cut out which lies wholly within the internal diameter of the annulus and over which the piston acts on the friction pad assembly. Diametrically opposite ends of the projection may engage with the internal wall of the piston to assist in supporting the shim in the brake whilst the friction pad assembly is inserted therein and drag-taking or other axially extending locating pins are inserted through superimposed openings in lugs in the friction pad assembly and the shim. This is particularly useful when shims are located on opposite sides of a disc between opposed pistons and a pair of complementary friction pad assemblies for engagement with opposite sides of the disc and common locating pins are provided for both friction pad assemblies.

If after fitting a shim a friction pad assembly is then forced or otherwise driven between the disc and the shim in a radially inwards direction, the shim acts as a guide for the pad assembly, is effective to prevent damage to the piston and the boot, and also transmit a reaction force to the piston by means of which the piston is forced back into the bore.

One embodiment of our invention is illustrated in the accompanying drawings in which:

FIB. 1 is a longitudinal section through a known disc brake for a vehicle;

Figure 1:
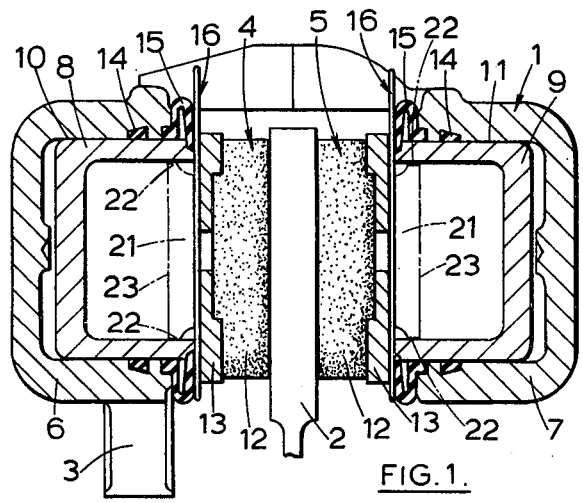

In the known disc brake illustrated in FIG. 1 of the drawings a rigid caliper 1 straddling a portion of a peripheral edge of a rotatable disc 2 is mounted on a stationary part adjacent to one face of the disc by means of lugs 3. Friction pad assemblies 4, 5 for engagement with opposite faces of the disc 2 are housed in opposed limbs 6, 7 of the caliper 1 and are adapted to be applied to the disc by opposed hydraulic pistons 8, 9 working in aligned axial bores 10, 11 in the limbs. Each friction pad assembly 4, 5 comprises a friction pad 12 carried by a rigid backing plate 13. Each piston 8, 9 is of hollow section acting on an adjacent backing plate 13 through its inner annular end and working through a seal 14 in the wall of the bore 10, 11. A flexible sealing boot 15 is connected between the inner end of each piston 8, 9 and the adjacent inner end of the respective corresponding limb 6,7.

The pistons 8, 9 act on the backing plate 13 through thrust transmitting devices 16 each comprising a planar shim of which a part is cut out over a portion of what would normally be the area of contact between the piston and the backing plate so that the brake applying forces from the pistons are applied to the backing plates into positions displaced from the centres of pressure of the friction pad assemblies.

It will be appreciated that the boots 15 may be cut or otherwise damaged if the shims 16 are inserted into spaces between the backing plates 13 and the pistons 8, 9 which are of widths less than the thickness of the shim 5.

Figure 2:
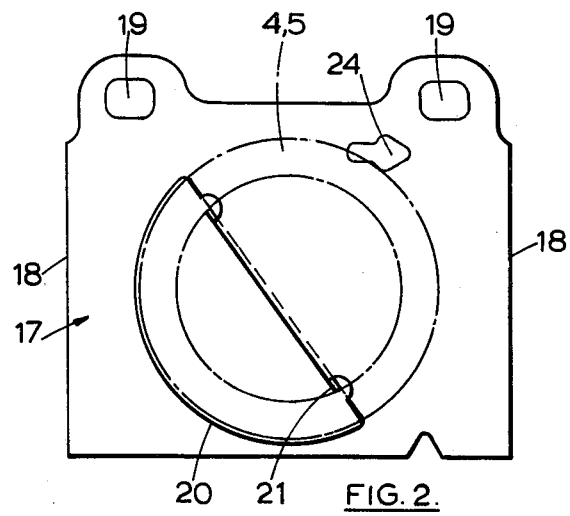
FIG. 2 is a side elevation of a thrust transmitting device for use in the brake of FIG. 2.
Figure 3:
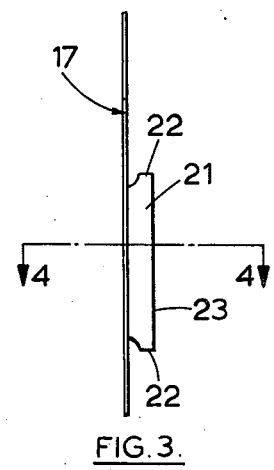
FIG. 3 is an end elevation of the device of FIG. 2.
Figure 4:
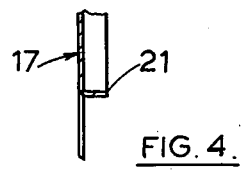
FIG. 4 is a section on the line 4—4 of FIG. 3.

According to our present invention each thrust transmitting device 16 for incorporation in the brake of FIG. 1 is of the construction illustrated in FIGS. 2 to 4 comprising a shim 17 having parallel end edges 18 for engagement with complementary sides of a limb of the caliper 1, and apertured spaced lugs 19 projecting from its upper edge through which are passed drag-taking or other locating pins for the friction pad assemblies 4, 5.

A portion of the shim of semi-circular outline is cut-away at 20 with a portion of the material of the shim previously occupying the region 20 being deformed into a tag 21 which lies in a plane substantially normal to the plane of the shim, is provided with parallel end edges 22 which are spaced apart by a distance not greater than the internal diameter of a piston 8, 9, and is provided with a straight outer edge 23 substantially parallel to the plane of the shim 17. The tag 21 defines a projection, and the axial length of the projection plus the thickness of the shim is less than the thickness of a backing plate and considerably less than the axial distance between the disc 2 and the inner end of a corresponding piston 8, 9 when fully retracted into its bore 10, 11. Thus the projection acts as a stop to prevent the shim being inserted into the brake with a friction pad assembly 4, 5 in position.

With a friction pad assembly 4, 5 omitted, the shim 17 can be inserted into the brake in a radial direction until the projection 21 is superimposed over the internal bore of a piston 8, 9 shown in chain-dotted outline in FIG. 2 whereafter the shim 17 can be moved in an axial direction to engage the projection diametrically in the bore until the shim engages the inner end of the piston 8, 9 as shown in chain dotted outline in FIG. 1. The friction pad assembly 4, 5 is then inserted into the brake. The engagement of the projection 21 in the piston assists in holding the shim 17 against relative movement in a radial direction, and the engagement of the end edges 18 in the caliper 1 prevents relative movement between the shim and the caliper in a circumferential direction. Thus, the shims 17 are located both radially and circumferentially which facilitates installation of the friction pad assemblies, particularly in lining up superimposed apertures in both shims 17 and both backing plates 12, 13 for the insertion therethrough of drag-taking or other locating pins.

When a friction pad assembly is worn, for example down to the backing plate, after first removing the location pins the worn pad assembly is then withdrawn radially from the brake. The shim 17 can then be moved axially away from the piston to detach it therefrom and then radially to withdraw it from the brake through the space remaining between the piston and the disc. Therefore the piston can be forced back into its bore.

Should any attempt be made to force back the piston with the shim 17 still in position, the shim may be damaged by the tool. However, since the shim 17 is located in the piston only by the ends 22 of the tag 21 the likelihood of any damage restricting or otherwise hindering detachment of the tag 21 from the piston is remote since such damage to the tag 21 will reduce the effective length of the tag 21 and in consequence reduce the force of engagement between the tag 21 and the piston by forcing the ends 22 out of engagement with the piston.

The tag 21, and thus the straight edge of the cut-away portion 20, is inclinded upwardly and rearwardly with respect to the direction of disc rotation indicated by a pierced out arrow 24 so that the applying force from the piston 8,9 is displaced circumferentially and radially outwards with respect to the centre of pressure of the friction pad assembly 4,5 on the side of the axis of the piston 8,9 with which any point on the surface of the disc last comes into alignment when rotating in a normal forward direction.

Each thrust transmitting device 16 is produced by two steps comprising a first stamping, piercing or punching operation to produce a blank provided with the apertured lugs 19 and the cut away portion 20 but including the tag 21 in developed form, and a second deforming operation to raise the projections 21 into the position normal to the plane of the shim 17.

I claim:

1. A disc brake for a vehicle comprising a rotatable disc, a housing adjacent to said disc and having a bore arranged with the axis thereof normal to the plane of said disc, a friction pad assembly for engagement with said disc located in said housing, a piston slidably guided in said bore for applying said friction pad assembly to said disc, and a thrust transmitting device interposed between said piston and said friction pad assembly and comprising a shim of which a part is cut-out over a portion of what would otherwise be the area of contact between said piston and said friction pad assembly so that when said piston is advanced in said bore towards said disc to apply said friction pad assembly to said disc, thrust from said piston is applied to said friction pad assembly only over the remainder of the said area of contact, wherein said thrust transmitting device includes a projection which defines a stop to prevent said shim from being inserted into said brake with said pad assembly in position, and the total overall effective axial length of said thrust transmitting device including said projection is less than the thickness of said pad assembly minus the wear thickness thereof so that said thrust transmitting assembly can be removed from its position of use in said brake after removal of said friction pad assembly and without forcing back said piston in said bore, irrespective of the wear condition of said pad assembly.

2. A disc brake as claimed in claim 1, wherein said projection comprises a portion of the part of said shim which would otherwise be cut out and discarded, said portion being deformed into a position normal to the plane of said shim.

3. A disc brake as claimed in claim 1, wherein said piston is hollow having an internal wall, and said projection is deformed from that edge of the said part which is cut-out and which lies wholly within the internal diameter of an annulus over which said piston acts on said friction pad assembly.

4. A disc brake as claimed in claim 3, wherein diametrically opposed ends of said projection engage with said internal wall of said piston to assist in supporting said shim in the brake.

5. A disc brake as claimed in claim 1, wherein said thrust transmitting device comprises a blank with a cut away portion and including a planar tag, and wherein said tag is raised into a position normal to the plane of said shim to define said projection.

* * * * *